United States Patent
Card et al.

(10) Patent No.: US 9,020,418 B2
(45) Date of Patent: Apr. 28, 2015

(54) METHODS AND APPARATUS RELATED TO A REPEATER

(75) Inventors: Robert A Card, Scarborough, ME (US); Kenneth P Snowdon, Falmouth, ME (US)

(73) Assignee: Fairchild Semiconductor Corporation, San Jose, CA (US)

( * ) Notice: Subject to any disclaimer, the term of this patent is extended or adjusted under 35 U.S.C. 154(b) by 474 days.

(21) Appl. No.: 13/408,441

(22) Filed: Feb. 29, 2012

(65) Prior Publication Data

US 2013/0225067 A1    Aug. 29, 2013

(51) Int. Cl.
*H04B 3/36* (2006.01)
*H04B 1/60* (2006.01)
*H04B 7/15* (2006.01)
*H04B 7/14* (2006.01)
*H04L 25/20* (2006.01)

(52) U.S. Cl.
CPC ...................................... *H04L 25/20* (2013.01)

(58) Field of Classification Search
CPC .................................................. H04B 7/15507

USPC .............................................. 455/7, 9, 15, 16
See application file for complete search history.

(56) References Cited

U.S. PATENT DOCUMENTS

| 6,125,109 | A | * | 9/2000 | Fuerter | ........................... 370/315 |
| 8,872,546 | B2 | * | 10/2014 | Zou et al. | ........................ 326/82 |
| 2010/0291865 | A1 | * | 11/2010 | Gore et al. | ........................ 455/7 |

OTHER PUBLICATIONS

MIPI Alliance Specification for D-PHY, MIPI Mobile Industry Processor Interface, Version 1.00.00, May 14, 2009, 125 pages.

* cited by examiner

*Primary Examiner* — Tilahun B Gesesse
(74) *Attorney, Agent, or Firm* — Brake Hughes Bellermann LLP

(57) ABSTRACT

In one general aspect, a repeater can include an input terminal configured to be coupled to a first portion of a MIPI signal path. The MIPI signal path being a unidirectional path between a receiver and a transmitter, the input terminal configured to receive a set of signals from the receiver via the MIPI signal path. The repeater can include an output terminal configured to be coupled to a second portion of the MIPI signal path, the first portion of the MIPI signal path and the second portion of the MIPI signal path having a combined distance greater than 30 centimeters.

22 Claims, 10 Drawing Sheets

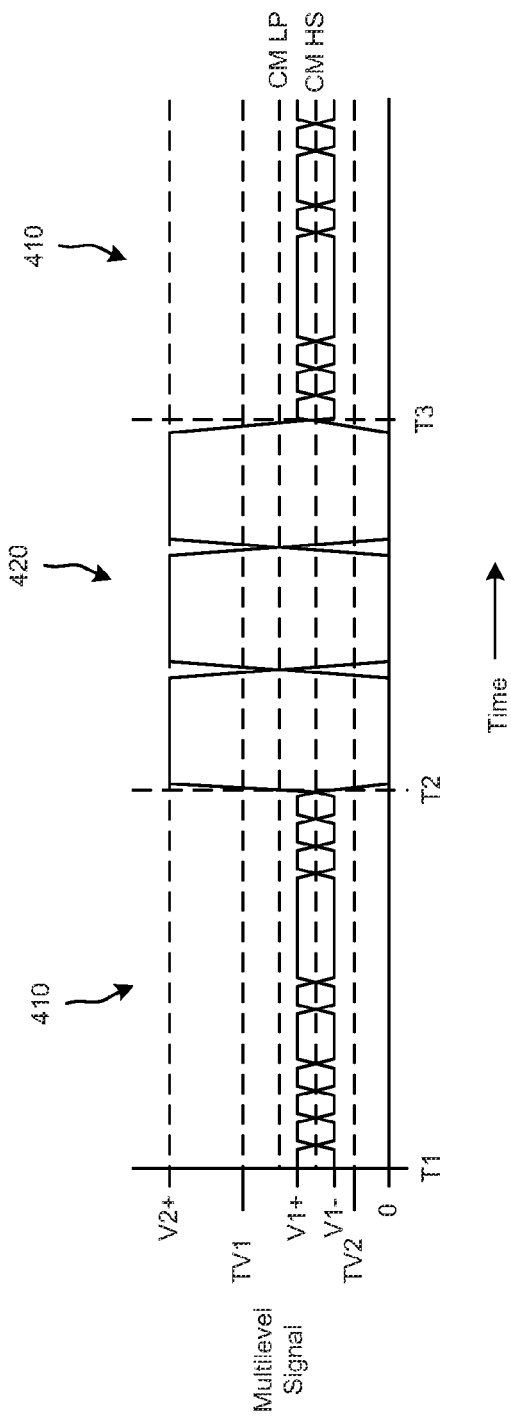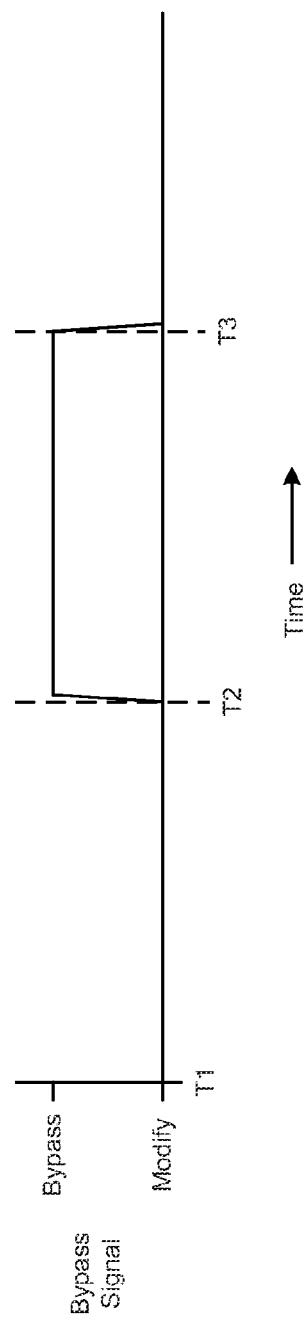

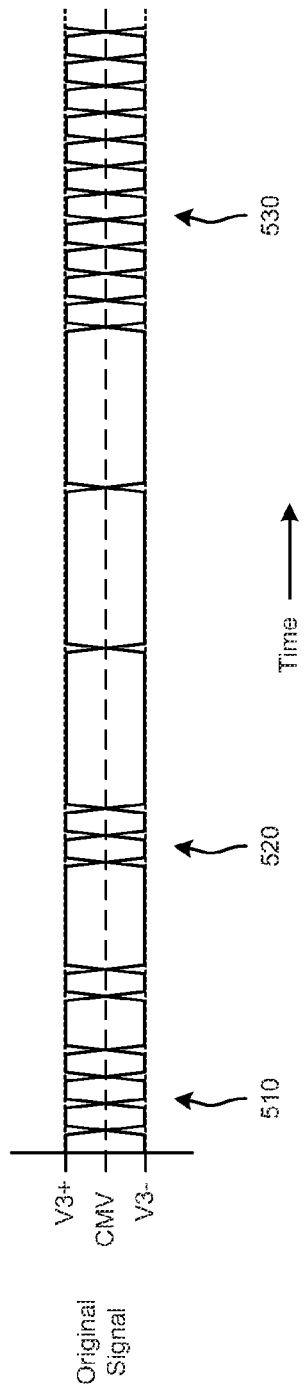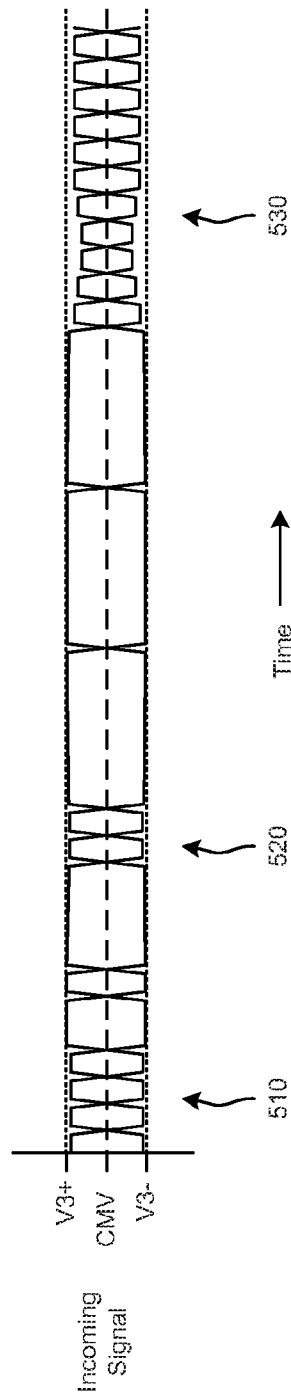

METHODS AND APPARATUS RELATED TO A REPEATER

TECHNICAL FIELD

This description relates to methods and apparatus for retransmitting a signal.

BACKGROUND

A repeater is a device configured to retransmit a signal between two points so that the signal can travel farther than would otherwise be possible without the repeater. Although some known repeaters can be configured to boost a signal before retransmitting the signal, these known repeaters lack functionality related to multiple signaling levels (e.g., frequencies), may not be available to process signals related to specified protocols/specifications, and/or so forth. Thus, a need exists for systems, methods, and apparatus to address the shortfalls of present technology and to provide other new and innovative features.

SUMMARY

In one general aspect, a repeater can include an input terminal configured to be coupled to a first portion of a MIPI signal path. The MIPI signal path being a unidirectional path between a receiver and a transmitter, the input terminal configured to receive a set of signals from the receiver via the MIPI signal path. The repeater can include an output terminal configured to be coupled to a second portion of the MIPI signal path, the first portion of the MIPI signal path and the second portion of the MIPI signal path having a combined distance greater than 30 centimeters.

In another general aspect, a method can include receiving a first differential signal compliant with a MIPI specification for a physical layer (PHY) connection, and determining that the first differential signal is below a voltage limit. The method can include sending, in response to the determining associated with the first differential signal, the first differential signal to a signal modification circuit, and receiving a second differential signal compliant with the MIPI specification. The method can also include determining that at least a portion of the second differential signal exceeds the voltage limit, and sending, in response to the determining associated with the second differential signal, the second differential signal to a bypass circuit configured to bypass the signal modification circuit.

In yet another general aspect, an apparatus can include a control circuit configured to receive a differential signal compliant with a MIPI specification for a physical layer (PHY) connection from a transmitter. The control circuit can be configured to identify a high-speed portion of the differential signal, and can be configured to identify a low power portion of the differential signal. The apparatus can also include a signal modification circuit configured to modify the high-speed portion of the differential signal, and configured to retransmit the low power portion of the differential signal, without modification, to a receiver.

The details of one or more implementations are set forth in the accompanying drawings and the description below. Other features will be apparent from the description and drawings, and from the claims.

BRIEF DESCRIPTION OF THE DRAWINGS

FIG. 4A is a signal diagram that illustrates a multilevel signal including a high-speed differential signal and a low-power differential signal.

FIG. 4B is a signal diagram that illustrates a bypass signal produced based on the multilevel signal shown in FIG. 4A.

FIGS. 5A through 5D are signal diagrams that illustrate processing associated with a signal transmitted by a transmitter to a repeater en route to a receiver.

DETAILED DESCRIPTION

Figure 1:
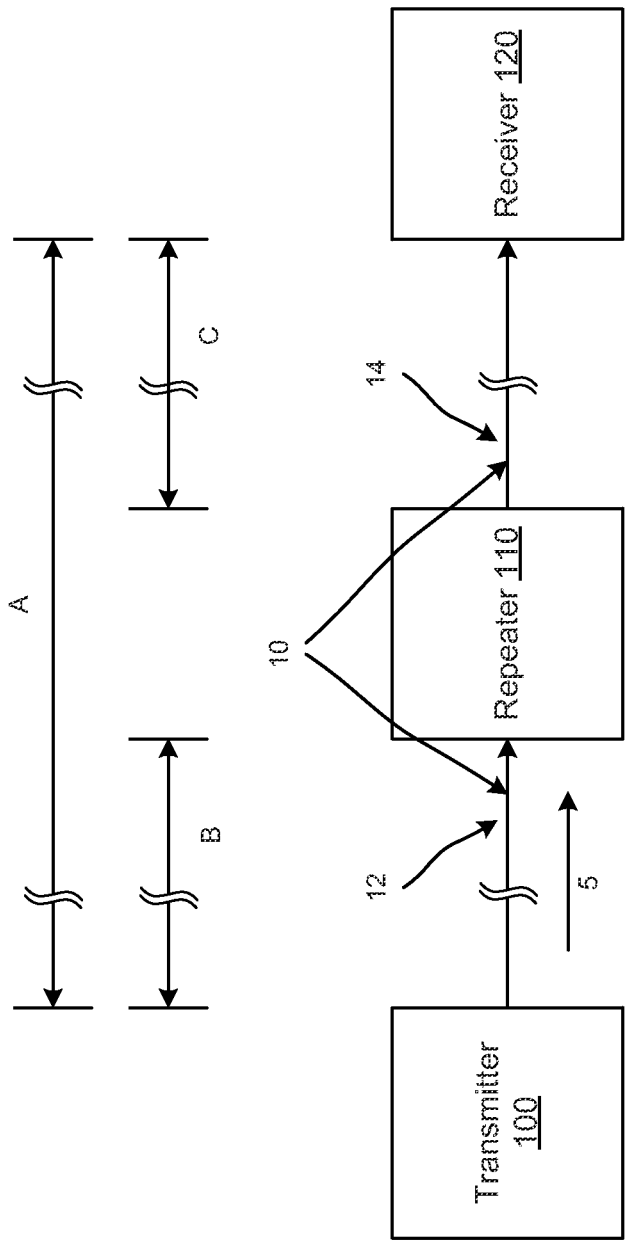
FIG. 1 is a block diagram that illustrates a repeater, according to an embodiment.

FIG. 1 is a block diagram that illustrates a repeater 110, according to an embodiment. The repeater 110 is configured to retransmit one or more signals received from the transmitter 100 via a first portion 12 of a signal path 10 to the receiver 120 via a second portion 14 of the signal path 10. In some embodiments, the repeater 110 can be configured to modify (e.g., restore and/or boost) one or more signals received from the transmitter 100 before retransmitting the signal(s) to the receiver 120. In some embodiments, a signal (or portion thereof) that is retransmitted by the repeater 110 without being modified (e.g., restored and/or boosted) (or without being processed by a circuit configured to perform modifying) can be referred to as being bypassed. In some embodiments, retransmission and modification (e.g., restoring, boosting) can be collectively referred to as processing (e.g., signal processing, handling) performed by the repeater 110. In some embodiments, restoring and/or boosting can include amplification and/or equalization.

In some embodiments, one or more signals (which can be referred to as a set of signals including multiple signals) transmitted between the transmitter 100 and receiver 120 via the signal path 10 and processed by the repeater 110 can be based on one or more protocols and/or specifications. In some embodiments, the repeater 110 can be configured to process multi-frequency signaling (also can be referred to as multi-level signaling) including several different types of signals. In such embodiments, the signal path 10 can include multiple separate physical paths (e.g., wires, cables, optical fibers). In some embodiments, one or more signals process by the repeater 110 (and transmitted via the signal path 10) can be multiplexed as portions of a single signal (or multiplexed into several different signals or signal portions (e.g., a high-speed portion, a low-power portion)). In such embodiments, the multiplexed signals can be transmitted via the signal path 10, which can be a single physical path (e.g., wire, cable, optical fiber) or can include multiple physical paths.

For example, one or more signals processed by the repeater 110 and transmitted via the signal path 10 can be based on (e.g., compliant with) a MIPI specification (e.g., a MIPI D-PHY specification, a MIPI M-PHY specification, a MIPI specification associated with a camera serial interface (CSI), a MIPI specification associated with a display serial interface (DSI)). In such embodiments, a first signal transmitted via the signal path 10 and processed by the repeater 110 can be a high-speed (HS) signal, and a second signal transmitted via the signal path 10 processed by the repeater 110 can be a low-power (LP) signal. Accordingly, one or more of the signals can be, or can define at least a portion of, a multi-frequency signal with different portions (e.g., high-speed portions, low-power portions, medium-speed portions). In some embodiments, one or more signals processed by the repeater 110 and transmitted via the signal path 10 can be a differential signal.

In some embodiments, one or more of the signals communicated via the signal path 10 can be data signals. For example, if the transmitter 100 is included in an image capture device, a signal communicated via the signal path 10 can be a stream of packets related to an encoded image.

As one or more signals are transmitted along the first portion 12 of the signal path 10, one or more portions of the signal(s) can become deteriorated (e.g., attenuated, jittered, noisy, drift away from a common mode voltage), which can be referred to as deteriorated portions. The repeater 110 can be configured to modify (e.g., restore, boost) the portion(s) of the signal(s) that have become deteriorated along the first portion 12 of the signal path 10 before retransmitting the signal(s) along the second portion 14 of the signal path 10. In other words, the modified portion(s) of the signal(s) can be retransmitted along the second portion 14 of the signal path 10. In some embodiments, one or more portions of the signal(s), when modified, can be restored and/or boosted before being retransmitted along the second portion 14 of the signal path 10. A signal (or portion thereof) received at the repeater 110 from the transmitter 100 can be referred to as an incoming signal (or as an incoming portion of the signal), and a signal (or portion thereof) sent from the repeater 110 to the receiver 120 can be referred to as an outgoing signal (or as an outgoing portion of the signal)

For example, in some embodiments, an amplitude of a portion of a signal received at the repeater 110 from the transmitter 100 can become attenuated along the first portion 12 of the signal path 10 from a first level to a second level. The attenuated portion of the signal can be restored (e.g., amplified) at the repeater 110 from the first level to the second level before the portion of the signal is retransmitted from the repeater 110 along the second portion 14 of the signal path 10 to the receiver 120. In some embodiments, another portion of the signal (which can include the restored portion) can be boosted (e.g., further amplified) at the repeater 110 before being retransmitted from the repeater 110 along the second portion 14 of the signal path 10 to the receiver 120.

The repeater 110 can be configured within (e.g., disposed within) the signal path 10 so that the signal path 10 can have a distance A (e.g., length) that is longer than would otherwise be possible without the repeater 110 included in the signal path 10. Specifically, without the repeater 110 included in the signal path 10, one or more signals transmitted along the signal path 10 having the distance A might become too deteriorated (e.g., attenuated, jittered) to be transmitted in a desirable (e.g., below a specified loss level, within a specification limit) between the transmitter 100 and receiver 120. In this embodiment, the distance A is approximately equal to a combination of a distance B of the first portion 12 of the signal path 10 and a distance C of the second portion 14 of the signal path 10.

As an example, an incoming signal from the transmitter 100 along the signal path 10 can be modified so that when the incoming signal is retransmitted (from the repeater 110) as an outgoing signal, the outgoing signal (or portion thereof) can have characteristics (e.g., an amplitude) that can be robust against further attenuation until the outgoing signal (or portion thereof) is received at the receiver 120. In other words, the outgoing signal can be modified so that anticipated attenuation of the outgoing signal may not degrade the outgoing signal to an undesirable level that cannot be resolved by the receiver 120.

In some embodiments, the distance B can be greater than (e.g., more than two or three times greater than) the distance C, or vice versa. In such embodiments, the repeater 110 may not be at a midpoint between the transmitter 100 and receiver 120. In some embodiments, the repeater 110 can be in close proximity to, associated with, or included in, the receiver 120.

As a specific example, if communication between the transmitter 100 and receiver 120 along the signal path 10 is based on a MIPI specification (e.g., a MIPI CSI-2 D-PHY specification), the maximum distance specified within the MIPI specification can be less than 30 centimeters (cm). In such embodiments, the distance B and the distance C can each be shorter than 30 cm, but the overall distance A of the signal path 10 can be greater than 30 cm. The repeater 110 can be configured to retransmit and modify one or more signals communicated along the signal path 10 so that the signal(s) can be received at the receiver 120 in a desirable fashion (e.g., with a desirable signal to noise ration, with a desirable amplitude) even though the overall distance A of the signal path 10 exceeds the upper boundary of the distance specified within the MIPI specification.

In some embodiments, the repeater 110 can be configured to selectively modify (e.g., restore, boost) one or more signals (or portions thereof) transmitted between the transmitter 100 and receiver 120. In some embodiments, the repeater 110 can be configured to selectively modify (e.g., restore, boost) one or more signals that can be included in, or can define at least a portion of, a multi-frequency signal.

For example, the repeater 110 can be configured to restore and boost a first signal (or portions thereof) retransmitted between the transmitter 100 and the receiver 120, and the repeater 110 can be configured to restore (but not boost) a second signal (or portions thereof) retransmitted between the transmitter 100 and receiver 120. The repeater 110 can also be configured to retransmit, without restoring and/or boosting, a third signal (or portions thereof) retransmitted between the transmitter 100 and receiver 120. In other words, the third signal (or portions thereof) can be bypassed by the repeater 110.

In some embodiments, the signal path 10, or portion thereof, between the transmitter 100 and the receiver 120 can be unidirectional. In such embodiments, a separate signal path (not shown), which can be parallel to and/or asynchronous with the signal path 10, can be bidirectional. In some embodiments, the signal path 10, or portion thereof, between the transmitter 100 and the receiver 120 can be bidirectional. In embodiments where at least a portion of the signal path 10 is bidirectional and/or where another signal path between the transmitter 100 and receiver 120 is bidirectional, the receiver 120, or an associated component, can be configured to function as a transmitter, and the transmitter 100, or and associated component, can be configured to function as a receiver.

Although not shown in FIG. 1, control signaling, in addition to the signaling via the signal path 10, can be transmitted between the transmitter 100 and the receiver 120. The control signaling can be associated with controlling functionality, protocols, and/or so forth related to the transmitter 100 and/or the receiver 120. For example, if the transmitter 100 is included in an image capture device (e.g., a camera), a control signal communicated between the transmitter 100 and the receiver 120 can be related to a stop capture time, a start capture time, a resolution of the image capture device, a protocol to be used to transfer encoded images, and/or so forth.

In some embodiments, one or more control signals transmitted between the transmitter 100 and the receiver 120 can be communicated via a signal path separate from the signal path 10. The separate signal path can be between the transmitter 100 and the receiver 120 via the repeater 110. In some embodiments, signals on the separate signal path can be communicated between the transmitter 100 and the receiver 120 without passing through the repeater 110. In some embodiments, control signaling can be specific to the devices including, or associated with, the transmitter 100 and/or the receiver 120. For example, if the transmitter 100 is included in an image capture device (e.g., a camera), the control signal can be a camera control interface (CCI) signal based on an I²C protocol. In some embodiments, one or more control signals transmitted between the transmitter 100 and the receiver 120 via a unidirectional path or a bidirectional path.

Although not shown in FIG. 1, in some embodiments, multiple repeaters, similar to repeater 110, can be included in the signal path 10 between the transmitter 100 and receiver 120. In such embodiments, signals originating at the transmitter 100 can be transmitted between the multiple repeaters en route to the receiver 120. Also in such embodiments, one or more of the signals can be modified (e.g., restored, boosted) at each of the multiple repeaters.

In some embodiments, the transmitter 100, the repeater 110, and the receiver 120 can be included in a variety of computing devices such as a wired device and/or a wireless device (e.g., wi-fi enabled device) and can be, for example, a computing entity (e.g., a personal computing device), a server device (e.g., a web server), a mobile phone, a touchscreen device, a personal digital assistant (PDA), a laptop (e.g., an Ultrabook™), a television including, or associated with, one or more processors, a tablet device, e-reader, and/or so forth. The computing device(s) can be configured to operate based on one or more platforms (e.g., one or more similar or different platforms) that can include one or more types of hardware, software, firmware, operating systems, runtime libraries, and/or so forth. An example of the transmitter 100, the repeater 110, and the receiver 120 included in a computing device is illustrated in FIG. 2.

Figure 2:
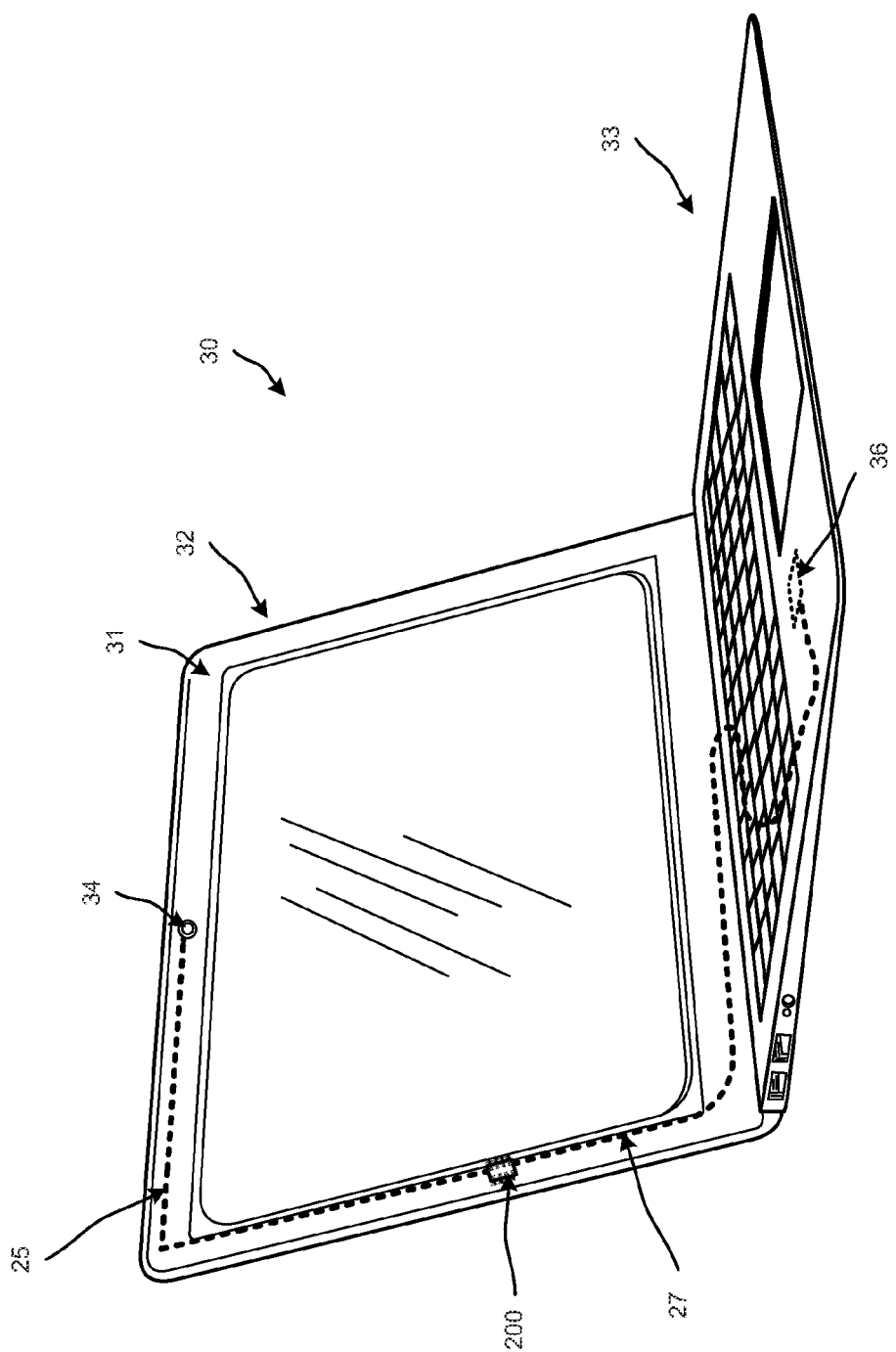
FIG. 2 is a diagram that illustrates a repeater included in a computing device, according to embodiment.

FIG. 2 is a diagram that illustrates a repeater 200 included in a computing device 30 (e.g., an Ultrabook™), according to embodiment. The repeater 200 can be similar to, or an example of, the repeater 110 described in connection with FIG. 1. In this embodiment, the repeater 200 is configured to retransmit and/or modify one or more signals transmitted from an image capture device 34 (e.g., a camera) of the computing device 30 to a processor 36 (e.g., a 32-bit processor, a 64-bit processor) of the computing device 30. The image capture device 34 can include, or can be associated with, a transmitter (e.g., transmitter 100) configured to produce a signal transmitted to the processor 36 via a physical path 25 and a physical path 27 (which are illustrated by dashed lines). The processor 36 can include, or can be associated with, a receiver (e.g., receiver 120).

As shown in FIG. 2, the physical path 25, and at least a portion of the physical path 27, are disposed within a bezel 31 of the display portion 32 of the computing device 30. Also, at least a portion of the physical path 27 is disposed within a base portion 33 of the computing device 30. In some embodiments, the physical path 25 and/or the physical path 27 can include a wire, a micro coaxial cable, a flexible cable, a wire on a printed circuit board (PCB), an optical fiber, and/or so forth. In some embodiments, the physical path 25 and the physical path 27 can be shorter than a maximum distance defined within with a MIPI specification, however, the combined distance of the physical path 25 and the physical path 27 can be longer than the maximum distance defined within the MIPI specification.

Table 1 below includes example MIPI specification parameters that can be used in conjunction with the repeater 200. The table includes MIPI specification parameters for a D-PHY system and for an M-PHY system.

TABLE 1

|  | D-PHY | M-PHY |
|---|---|---|
| Minimum Number of Pins Per Direction | 4 | 2 |
| Minimum Configuration | 4 pins Half-duplex | 4 pins Dual-simplex |
| Minimal UniPRO Configuration | 8 pins | 4 pins |
| Medium | <30 cm PCB, Flex, Micro Coax | <30 cm PCB, Flex, Micro Coax, >5 m Optical Fiber |
| Data Rate Per Lane (HS) | >80 Mb/s | >1.25 Gb/s |
| Data Rate Per Lane (LP) | <10 Mb/s | 10k-600 Mb/s |
| Electrical Signaling (HS) | SLVS-200 | SLVS-120 |
| Electrical Signaling (LP) | LVCMOS 1.2 V | SLVS-200 w/o RX-$R_T$ |
| HS Clocking Method | DDR Source-Sync Clk | Custom Clk |
| HS Line Coding | None or 8b9b | 8b10b |
| Power - Energy/bit | Low | Lower |
| Receiver CDR Required | No | Yes |
| LP only PHY's | Disallowed | Allowed |

Although illustrated as being included in the bezel 31 of the computing device 30, the repeater 200 can be included in different portions of the computing device 30. For example, the repeater 200 can be included in the base portion 33 of the computing device 30. Although not shown in FIG. 2, in some embodiments, multiple repeaters, such as repeater 200, can be included in the computing device 30 along a signal path between the image capture device 34 and the processor 36.

Although illustrated as being included in a signal path between the image capture device 34 and the processor 36 in this embodiment, the repeater 200 can be included in a signal path between a variety of devices. For example, a repeater (e.g., the repeater 200) can be included in a computing device (e.g., computing twice 30) between any combination of a display device, audio device, a video device, a memory device, a power management device, a processor, and/or so forth.

Figure 3:
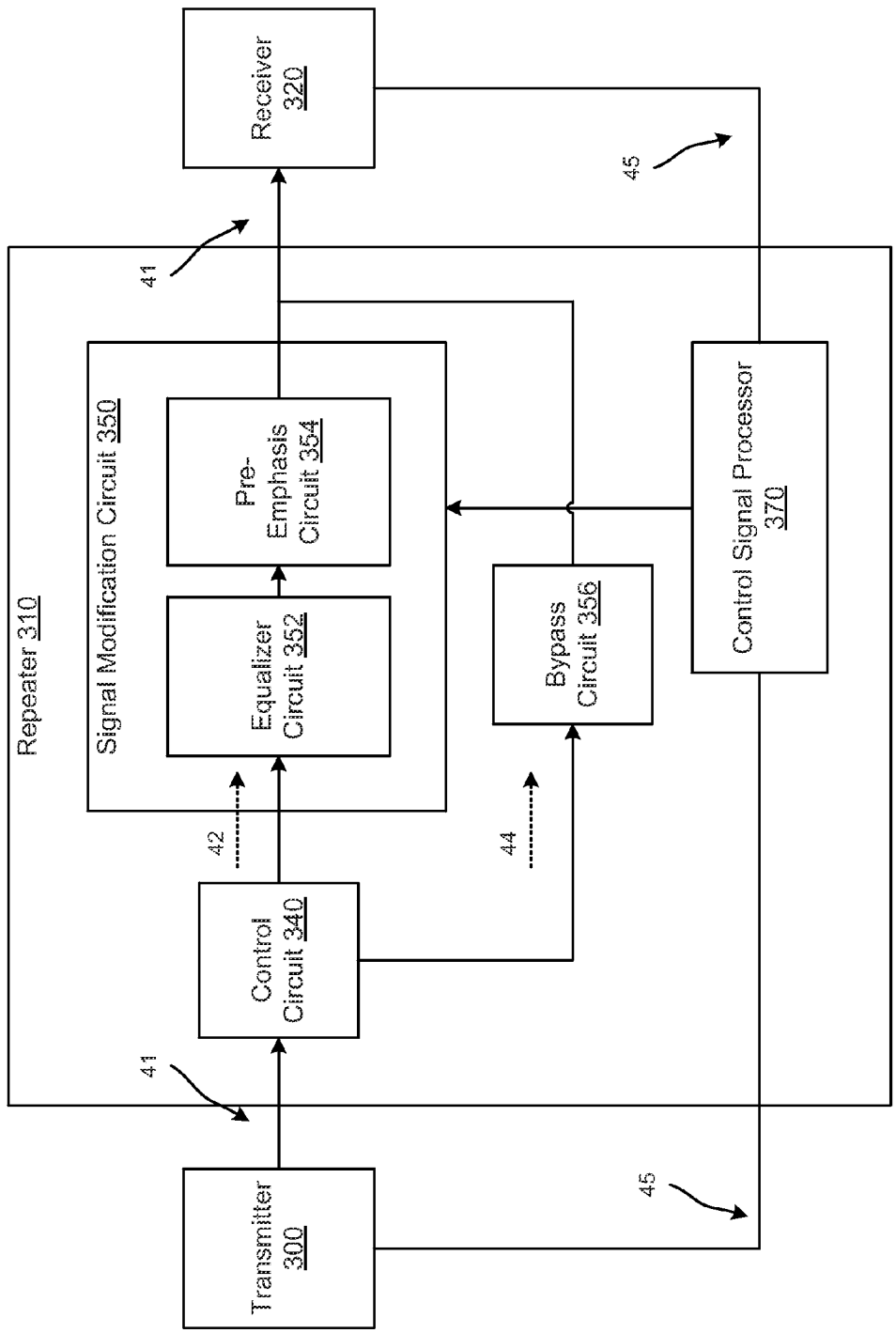
FIG. 3 is another block diagram that illustrates a repeater, according to an embodiment.

FIG. 3 is another block diagram that illustrates a repeater 310, according to an embodiment. As shown in FIG. 3, the repeater 310 is included in a signal path 41 between the transmitter 300 and a receiver 320. The repeater 310 shown in FIG. 3 can be an embodiment of the repeater 110 shown in FIG. 1.

As shown in FIG. 3, the repeater 310 includes a control circuit 340. The control circuit 340 is configured to receive a signal (e.g., a signal compliant with a MIPI specification) from the transmitter 300 (via the signal path 41). In some embodiments, the signal received at the control circuit 340 can be referred to as an incoming signal. The control circuit 340 is configured to analyze the incoming signal and is configured to forward the incoming signal for processing at a signal modification circuit 350 of the repeater 310 based on the analysis. In some embodiments, the control circuit 340 can be configured to forward the signal for processing at one or more different modules (or along one of several paths).

In this embodiment, the repeater 310 includes two different processing paths—processing path 42 and processing path 44. The processing path 42 includes the signal modification circuit 350 (e.g., an equalizer circuit 352 and a pre-emphasis circuit 354 of the signal modification circuit 350), and the processing path 44 includes a bypass circuit 356. In some embodiments, the bypass circuit 356 can be a type of pass-through circuit configured to bypass processing performed by the equalizer circuit 352 and/or the pre-emphasis circuit 354. The equalizer circuit 352 can be configured to restore an incoming signal that has been attenuated, and the pre-emphasis circuit 354 can be configured to boost the incoming signal (or a restored version of the incoming signal). The incoming signal can be boosted so that when the incoming signal is retransmitted as an outgoing signal, the outgoing signal (or portion thereof) can have characteristics (e.g., an amplitude) that can be robust against further attenuation until the outgoing signal (or portion thereof) is received at the receiver 320. In other words, the outgoing signal can be amplified so that anticipated attenuation of the outgoing signal may not degrade the outgoing signal to an undesirable level that cannot be resolved by the receiver 320.

The control circuit 340 can be configured to forward an incoming signal for processing to one of the processing paths 42, 44 based on one or more threshold conditions (also can be referred to as modification conditions) being satisfied or unsatisfied. In some embodiments, the threshold condition can be related to a voltage of the incoming signal, a frequency of the incoming signal, an amplitude of the incoming signal, an attenuation level of the incoming signal, and/or so forth.

For example, the transmitter 300 can be configured to produce a signal received at the control circuit 340. Portions of the signal that are above a threshold voltage can be forwarded to the bypass circuit 356, which can bypass processing performed by the equalizer circuit 352 and/or the pre-emphasis circuit 354 (and the signal modification circuit 350). Portions of the signal that are below the threshold voltage can be forwarded for processing by the equalizer circuit 352 and/or the pre-emphasis circuit 354.

In some embodiments, one or more characteristics of modification performed by the signal modification circuit 350 can vary. In some embodiments, one or more characteristics of modification performed by the signal modification circuit 350 can vary based on one or more threshold conditions. For example, a signal can be boosted with a first specified gain level (in decibels (dB)) based on a first threshold condition being satisfied, and the signal can be boosted with a second specified gain level (in decibels (dB)) based on a second threshold condition being satisfied. As another example, a first portion of a signal can be modified (e.g., restored and/or boosted) based on a first threshold condition being satisfied, and a second portion of the signal (different from or overlapping with the first portion of the signal) can be modified (e.g., restored and/or boosted) based on a second threshold condition being satisfied.

In some embodiments, different portions of the signal can be processed differently at the repeater 310 based on one or more threshold conditions because the different portions of the signal can have different levels of susceptibility to, for example, attenuation, noise, distortion, and/or so forth. For example, a first portion of a signal that may be significantly impacted by attenuation can be triggered for processing by the control circuit 340 at the equalizer circuit 352 and the pre-emphasis circuit 354 of the signal modification circuit 350. A second portion of the signal that may be robust against attenuation can be triggered by the control circuit 340 to bypass processing of the equalizer circuit 352 and the pre-emphasis circuit 354 via the bypass circuit 356.

As a specific example, a signal compliant with a MIPI specification can be received at the control circuit 340 from the transmitter 300. The signal can be a multilevel signal that includes a high-speed (HS) differential signal (or portion) and a low-power (LP) differential signal (or portion). The high-speed differential signal can have a voltage swing (also can be referred to as a differential voltage range) that is significantly lower than (e.g., 1.5 to 10 times lower than) a voltage swing of the low-power differential signal. For example, the voltage swing of the high-speed differential signal can be a few hundred millivolts (mV) (e.g., 100 mV, 200 mV, 300 mV, 400 mV, 800 mV) and the voltage swing of the low-power differential signal can one or more volts (e.g., 1 V, 1.2 V, 2 V, 3 V, 5 V). Accordingly, the control circuit 340 can be configured to forward the low-power differential signal to bypass circuit 356, and can be configured to forward the high-speed differential signal to the equalizer circuit 352 and the pre-emphasis circuit 354 for processing based on a difference in voltage swing between the high-speed differential signal and the low-power differential signal. In some embodiments, voltages associated with one or more signals can be lower than a supply voltage.

FIG. 4A is a signal diagram that illustrates a multilevel signal including a high-speed differential signal 410 and a low-power differential signal 420. In this embodiment, the high-speed differential signal 410 is a first portion between approximately times T1 and T2 and a second portion starting at approximately time T3. As shown in FIG. 4A, the high-speed differential signal is centered about a common mode voltage CM HS and the low-power differential signal is centered about a common mode voltage CM LP. In this embodiment, the high-speed differential signal has a voltage swing (or differential voltage range) that varies between V1− and V1+, and the low-power differential signal as a voltage swing or differential voltage range) that varies between 0 and V2+. As shown in FIG. 4A, the high-speed differential signal 410 has a higher frequency than a frequency of the low-power differential signal 420. For example, in some embodiments, the high-speed differential signal 410 can have a frequency of 800 Mb/s and the low-power differential signal 420 can have a frequency of 10 Mb/s.

In this embodiment, a control circuit of a repeater (e.g., the control circuit 340 of the repeater 310 shown in FIG. 3) is configured to trigger processing of portions of the multilevel signal via the different processing paths 42, 44 based on the voltage limits TV1 and TV2. Specifically, portions of the multilevel signal that have a differential voltage swing within the voltage limits TV1 and TV2 are designated for (e.g., identified for) modification (e.g., via the equalizer circuit 352 and the pre-emphasis circuit 354 of the signal modification circuit 350 shown in FIG. 3), and portions of the multilevel signal that that have a differential voltage swing outside of the voltage limits TV1 and TV2 are designated for bypassing (e.g., via the bypass circuit 356).

FIG. 4B is a signal diagram that illustrates a bypass signal produced based on the multilevel signal shown in FIG. 4A. As shown in FIG. 4B, the bypass signal indicates that portions of the multilevel signal between approximately times T2 and T3 are designated for bypassing. Specifically, the low-power differential signal 420 is designated for bypassing because the low-power differential signal 420 has a voltage swing outside of the voltage limits TV1 and TV2. Also, as shown in FIG. 4B, the bypass signal indicates that portions of the multilevel signal between times T1 and T2 and portions of the multilevel signal after time T3 are designated for modification. Specifically, the high-speed differential signal 410 is designated for modification because the high-speed differential signal 410 has a voltage swing within the voltage limits TV1 and TV2.

Although FIGS. 4A and 4B are associated with a threshold condition that includes two voltage limits, in some embodiments, processing of a signal based on different processing paths (e.g., processing paths 42, 44) can be based on a single voltage limit or based on more than two voltage limits. In some embodiments, processing of the signal can be based on the frequency of the signal, an attenuation level identified based on a target signal (e.g., a target signal having a target voltage level), and/or so forth.

Also, FIGS. 4A and 4B are associated with a multilevel signal including two different signals differential signals, in some embodiments, a multilevel signal can have more than two different signals (e.g., differential signals). For example, the multilevel signal subjected to threshold conditions triggering different processing paths at a repeater can include several differential signals with similar, or the same, voltage swing, but different frequencies. In some embodiments, the multilevel signal can include three different signals with different voltage swings that are centered around one or more common mode voltages.

Figure 5C:
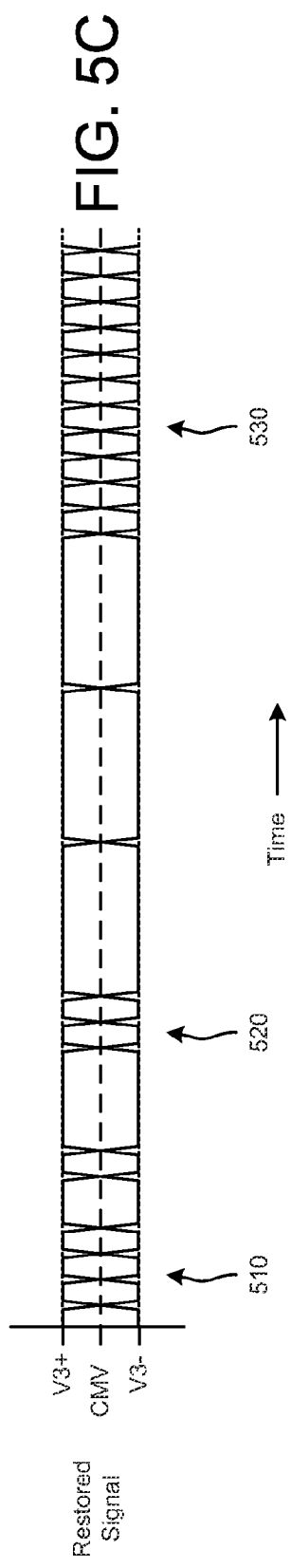
Figure 5D:
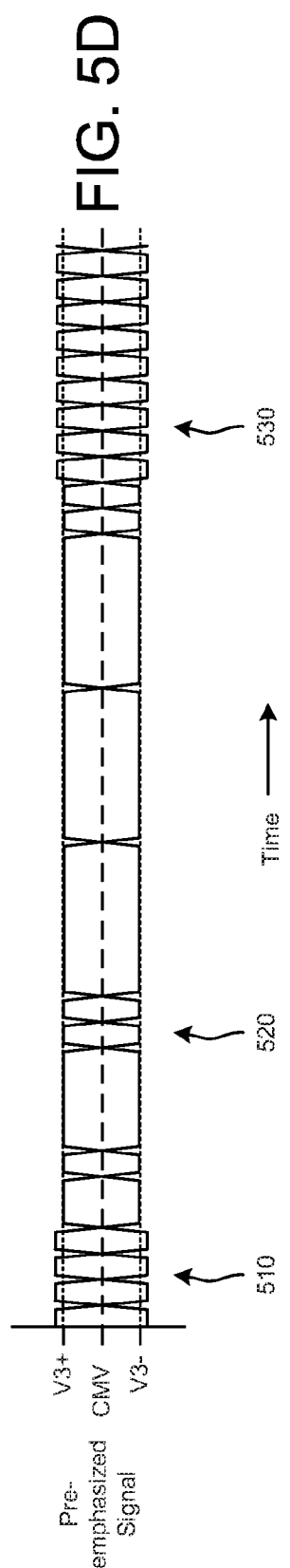

FIGS. 5A through 5D are signal diagrams that illustrate processing associated with a signal transmitted by a transmitter (e.g., the transmitter 100 shown in FIG. 1) to a repeater (e.g., the repeater 110 shown in FIG. 1) en route to a receiver (e.g., the receiver 120 shown in FIG. 1). An original signal produced by the transmitter (e.g., the transmitter 100 shown in FIG. 1) is shown in FIG. 5A. As shown in FIG. 5A, the original signal is centered approximately about a common mode voltage CMV and has a voltage swing (e.g., a target voltage swing) between V3+ and V3−. The original signal, after being produced by the transmitter, can be sent (e.g., transmitted) to the repeater. In some embodiments, the original signal can be compliant with a MIPI specification.

FIG. 5B is a signal diagram that illustrates an incoming signal. The incoming signal shown in FIG. 5B is the original signal received at the repeater from the transmitter after being transmitted along a physical path (e.g., the first portion 12 of the signal path 10 shown in FIG. 1). As shown in FIG. 5B, portion 510, portion 520, and portion 530 of the incoming signal are attenuated. In some embodiments, the attenuation can occur as the incoming signal is transmitted along the physical path. As shown in FIG. 5B, the portions 510, 520, 530 are relatively high-frequency portions of the incoming signal that can be relatively susceptible to attenuation compared with relatively low frequency portions of the incoming signal (e.g., a portion between portions 520 and 530). In this embodiment, the incoming signal is designated for modification by a control circuit (e.g., the control circuit 340 shown in FIG. 3).

FIG. 5C illustrates the incoming signal shown in FIG. 5B modified to a restored signal. As shown in FIG. 5C, the respective amplitudes of the portions 510, 520, 530 are restored (e.g., amplified) to a target amplitude or voltage swing. In this embodiment, the portions 510, 520, 530 are restored to the voltage values of V3+ and V3−. In some embodiments, the restoring of the signal can be performed by, for example, the equalizer circuit 352 of the signal modification circuit 350 shown in FIG. 3.

Although not shown in FIG. 5C, in some embodiments, only portions of a signal that satisfy a threshold condition (which can be referred to as a restoration condition or generally referred to as a modification condition) may be restored. For example, only a portion of a signal that has been attenuated a specified amount (or more than a specified amount), has a specified frequency (or more or less than a specified frequency), and/or so forth, may be restored.

FIG. 5C illustrates the restored signal shown in FIG. 5C being further modified as a pre-emphasized signal. As shown in FIG. 5C, the amplitudes of the portions 510 and 530 are boosted (e.g., amplified) to voltage values exceeding a target amplitude or voltage swing. In this embodiment, portions 510 and 530, which are relatively high-frequency portions, are boosted to voltage values exceeding the voltage swing of V3+ and V3−. The relatively high-frequency portions can be boosted so that attenuation that can occur to the relatively high-frequency portions, when the pre-emphasized signal is sent from the repeater to the receiver, can be mitigated in a desirable fashion. In other words, portions of restored signal (shown in FIG. 5C) can be boosted in anticipation of (e.g., to compensate for) later attenuation when retransmitted to the receiver. In some embodiments, the boosting of the signal can be performed by, for example, the pre-emphasis circuit 354 of the signal modification circuit 350 shown in FIG. 3. In some embodiments, the pre-emphasized signal can be transmitted as an outgoing signal from the repeater.

Although not shown in FIG. 5C, in some embodiments, only portions of a signal that satisfy a threshold condition (which can be referred to as a boosting condition or generally referred to as a modification condition) may be boosted. For example, only a portion of a signal that had previously been attenuated (before restoration) a specified amount (or more than a specified amount), has a specified frequency (or more or less than a specified frequency), and/or so forth, may be boosted. In some embodiments, a level of boosting of a signal can be based on one or more boosting conditions. For example, at least a portion of a signal can be boosted by a specified decibel level (e.g., 20 dB, 10 dB) depending on a frequency of the portion of the signal exceeding or falling below a frequency (e.g., a 1 GHz frequency).

Although not shown in FIGS. 5A through 5D, other types of distortion to an incoming signal can be handled by a repeater. For example, portions of an incoming signal received that a repeater from a receiver can have jitter caused by, for example, group delay. In some embodiments, the repeater can be configured to process the incoming signal so that jitter included in the incoming signal can be removed and/or so that the incoming signal, when retransmitted as an outgoing signal can be robust against jitter (e.g., anticipated jitter).

As another example, portions of an incoming signal received that a repeater from a receiver may not be centered around the common mode voltage CMV. In some embodiments, the repeater can be configured to process the incoming signal so that the incoming signal can be re-centered about the common mode voltage CMV before or when being retransmitted as an outgoing signal.

Referring back to FIG. 3, the signal modification circuit 350 includes the processing path 42 and the processing path 44. In some embodiments, the signal modification circuit 350 can include different processing paths than those shown in FIG. 3. For example, an additional processing path (in addition to processing paths 42, 44) can include the pre-emphasis circuit 354 and exclude the equalizer circuit 352. As another example, an additional processing path (in addition to processing paths 42, 44) can exclude the pre-emphasis circuit 354 and include the equalizer circuit 352. In some embodiments, one or more processing paths of the signal modification circuit 350 can include different processing elements and those shown in FIG. 3. For example, a processing path can include an amplification circuit in addition to, or in lieu of, the equalizer circuit 352.

Although not shown in FIG. 3, in some embodiments, the signal modification circuit 350 may exclude the pre-emphasis circuit 354 or may exclude the equalizer circuit 352. Also, although not shown in FIG. 3, in some embodiments, the bypass circuit 356 can optionally be excluded from the repeater 310. In such embodiments, processing of signals at the repeater 310 between the transmitter 300 and the receiver 320 may not bypass processing by either the equalizer circuit 352 or the pre-emphasis circuit 354. Implementations using different configurations of a signal modification circuit are described in connection with FIGS. 6 and 7.

Figure 6:
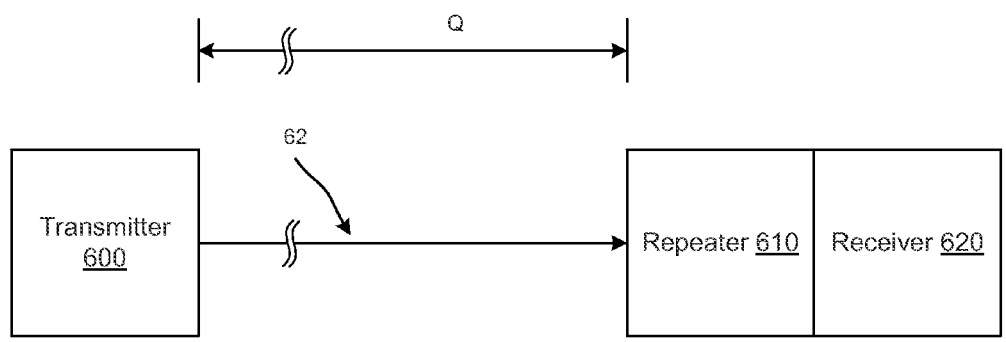
FIG. 6 is another block diagram that illustrates a repeater within a signal path between a transmitter and a receiver.

FIG. 6 is a block diagram that illustrates a repeater 610 within a signal path 62 between a transmitter 600 and a receiver 620. In this embodiment, the signal path 62 has a distance Q. If communication between the transmitter 600 and the receiver 620 is based on a MIPI specification, the distance Q can be, for example, greater than a maximum distance specified within the MIPI specification (e.g., greater than 30 cm).

Because the repeater 610 is disposed adjacent to (or in relatively close proximity to) the receiver 620, the repeater 610 shown in FIG. 6 does not include a pre-emphasis circuit (the pre-emphasis circuit 354 shown in FIG. 3). Boosting of a signal transmitted along the signal path 62 to compensate for later attenuation is obviated by the position of the repeater 610 with respect to the receiver 620. The repeater 610 can include a bypass circuit (e.g., the bypass circuit 356 shown in FIG. 3) and an equalizer circuit (e.g., the equalizer circuit 352 shown in FIG. 3). Although not shown, in some embodiments, the repeater 610 can be included in the receiver 620.

Figure 7:
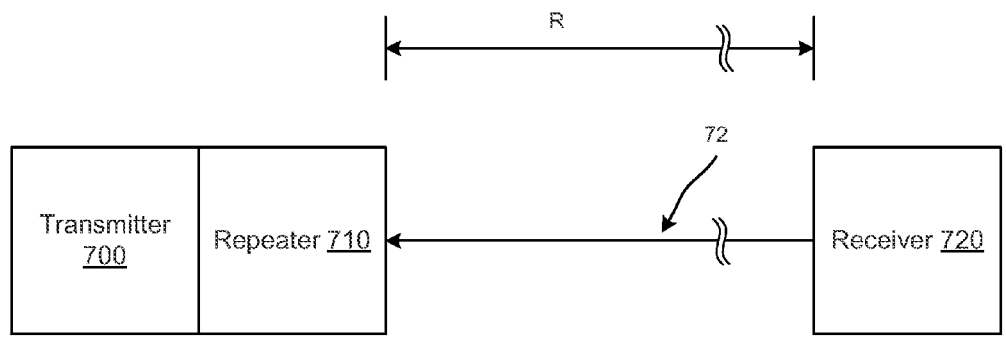
FIG. 7 is a block diagram that illustrates a repeater within a signal path between a transmitter and a receiver.

FIG. 7 is another block diagram that illustrates a repeater 710 within a signal path 72 between a transmitter 700 and a receiver 720. In this embodiment, the signal path 72 has a distance R. If communication between the transmitter 700 and the receiver 720 is based on a MIPI specification, the distance R can be, for example, greater than a maximum distance specified within the MIPI specification (e.g., greater than 30 cm).

Because the repeater 710 is disposed adjacent to (or in relatively close proximity to) the transmitter 700, the repeater 710 shown in FIG. 7 does not include an equalizer circuit (the equalizer circuit 352 shown in FIG. 3). Restoring a signal transmitted from the transmitter 700 is obviated by the relatively close position of the repeater 710 with respect to the transmitter 700 because the signal may not be deteriorated (e.g., may not be substantially deteriorated) when received at the repeater 710. The repeater 710 can include a bypass circuit (e.g., the bypass circuit 356 shown in FIG. 3) and a pre-emphasis circuit (e.g., the pre-emphasis circuit 354 shown in FIG. 3). Although not shown, in some embodiments, the repeater 710 can be included in the transmitter 700.

Referring back to FIG. 3, in some embodiments, the repeater can have different portions of the signal modification circuit 350 dedicated to different signal paths (e.g., signal path 41) between the transmitter 300 and receiver 320. For example, the control circuit 340 and the signal modification circuit 350 can be associated with a first signal path between the transmitter 300 and receiver 320. An additional control circuit (in addition to control circuit 340) and an additional signal modification circuit (in addition to signal modification circuit 350) can be included in the repeater 310 and can be configured to process a signal associated with a second signal path between the transmitter 300 and receiver 320.

In some embodiments, the control circuit 340, the signal modification circuit 350 (e.g., the equalizer circuit 352, the pre-emphasis circuit 354), the bypass circuit 356, and so forth, can include any combination of hardware components such as analog components and digital components. In some embodiments, at least some portions of the repeater 310 can be implemented using software. Accordingly, at least some portions of the repeater 310 can be implemented using any combination of hardware and software.

As shown in FIG. 3, the transmitter 300 and the receiver 320 are configured to communicate one or more control signals via a control signal path 45. In this embodiment, the one or more control signals are processed at the repeater 310 using a control signal processor 370. In some embodiments, one or more control signals communicated via the control signal path 45 can be specific to the devices including, or associated with, the transmitter 300 and/or the receiver 320. For example, the control signal can be a CCI signal based on an I2C protocol. In some embodiments, the control signal path 45 can be a unidirectional signal path or a bidirectional signal path. In some embodiments, the control signal processor 370 can function as a level shifter.

In some embodiments, one or more control signals communicated via the control signal path 45 can be used (e.g., use by the control signal processor 370) to set (e.g., specify) one or more characteristics of modification (e.g., gain level, frequency selectivity, threshold conditions) of the equalizer circuit 352 and/or the pre-emphasis circuit 354. For example, a control signal originating at (e.g., produced at) the transmitter 300 can be configured to set a gain level for boosting a signal at the pre-emphasis circuit 354 for a specified set of frequencies of the signal. If the repeater 310 is coupled to multiple different transmitters and/or receivers, the control signal can be configured for a specified transmitter, a specified receiver, and/or a specified transmitter/receiver combination.

Figure 8:
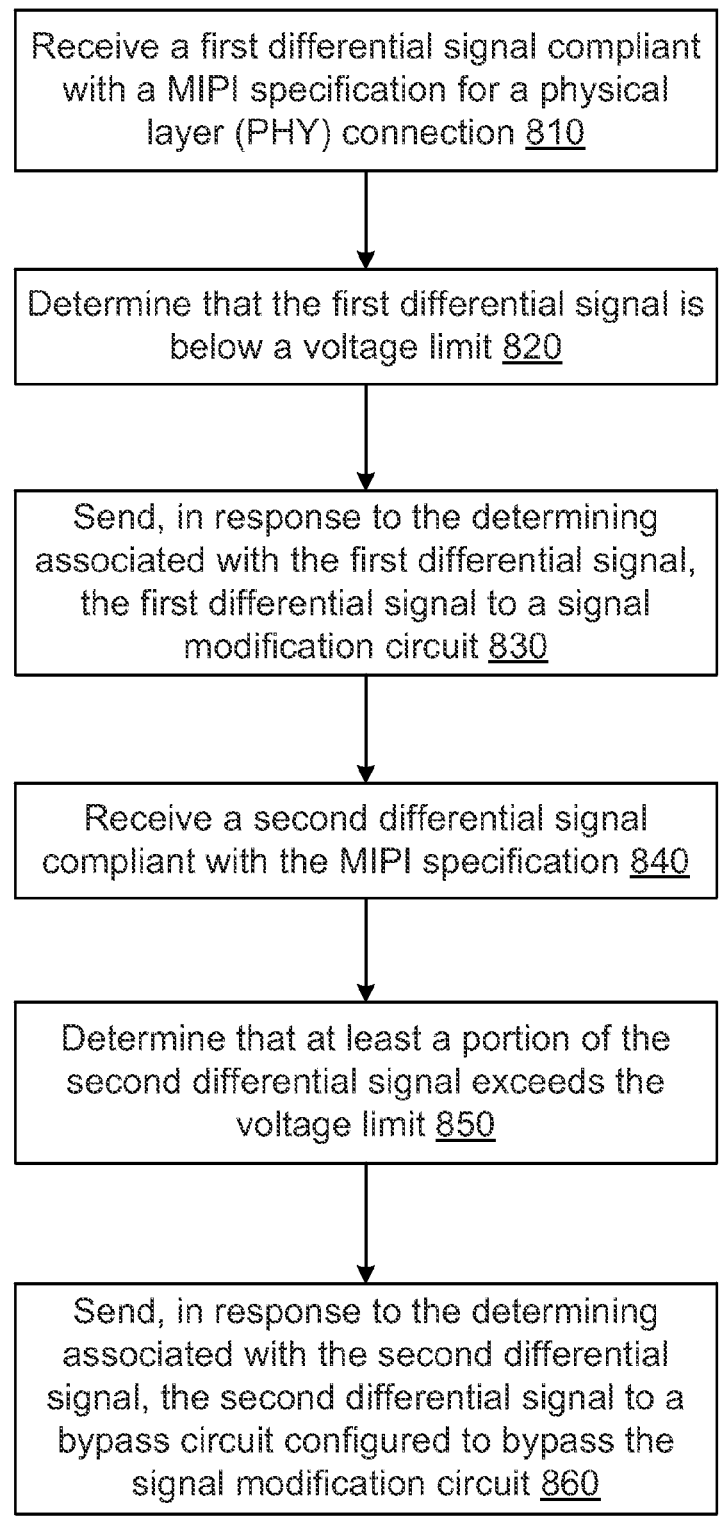
FIG. 8 is a flowchart that illustrates a method for handling processing of a signal at a repeater, according to an embodiment.

FIG. 8 is a flowchart that illustrates a method for handling processing of a signal at a repeater, according to an embodiment. The repeater can be, or can include, for example, the repeater 110 shown in FIG. 1, the repeater 310 shown in FIG. 3, and so forth.

As shown in FIG. 8, a first differential signal compliant with a MIPI specification for a physical layer (PHY) connection is received (block 810). In some embodiments, the first differential signal can be received at the repeater (e.g., the repeater 310 shown in FIG. 3). In some embodiments, the first differential signal can be, for example, a high-speed differential signal. In some embodiments, the first differential signal can be produced at a transmitter such as a camera, a processor, and/or so forth.

The first differential signal is determined to be below a voltage limit (block 820), and in response to the determining associated with the first differential signal, the first differential signal is sent to a signal modification circuit (block 830). The signal modification circuit can be, for example, the signal modification circuit 350 shown in FIG. 3. In some embodiments, one or more characteristics of processing (e.g., modification) of the first differential signal can be managed by a control signal processor such as the control signal processor 370 shown in FIG. 3. In some embodiments, one or more characteristics of processing of the first differential signal can be based on one or more control signals.

A second differential signal compliant with the MIPI specification is received (block 840). In some embodiments, the second differential signal can be received at the repeater (e.g., the repeater 310 shown in FIG. 3). In some embodiments, the first differential signal can be produced at a transmitter such as a camera, a processor, and/or so forth. In some embodiments, the second differential signal can be, for example, a low-power differential signal.

At least a portion of the second differential signal is determined to exceed the voltage limit (block 850), and in response to the determining associated with the second differential signal, the second differential signal is sent to a bypass circuit configured to bypass the signal modification circuit (block 860). The bypass circuit can be, for example, the bypass circuit 356 shown in FIG. 3.

Figure 9:
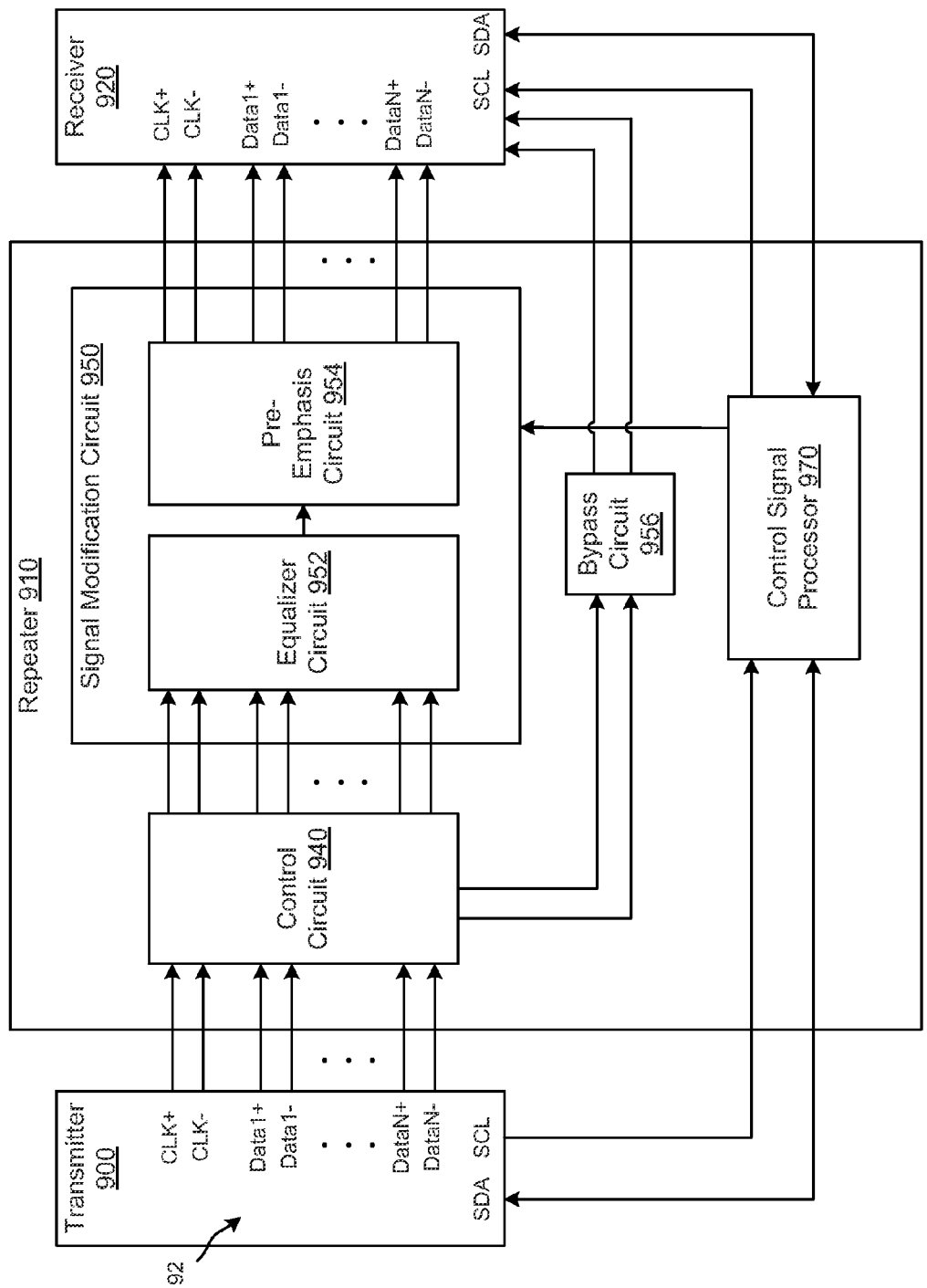
FIG. 9 is another block diagram that illustrates a repeater, according to an embodiment.

FIG. 9 is another block diagram that illustrates a repeater 910, according to an embodiment. As shown in FIG. 9, the repeater 910 is included in a signal path 41 between the transmitter 900 and a receiver 920. The repeater 910 shown in FIG. 9 can be an embodiment of the repeater 110 shown in FIG. 1.

As shown in FIG. 9, the repeater 910 includes a control circuit 940. The control circuit 940 is configured to receive a one or more signals 92 (e.g., a signal compliant with a MIPI specification) (also can be referred to as data signals) from the transmitter 900 (via the signal path 41). As illustrated in FIG. 9, the signals 92 include several differential data signals Data1+/Data1− through DataN+/DataN−. The control circuit 940 is configured to analyze the signals 92 and is configured to forward one or more of the signals 92 for processing at a signal modification circuit 950 of the repeater 910 based on the analysis (using one or more threshold or modification conditions). In some embodiments, the control circuit 940 can be configured to forward one or more of the signals 92 for processing at one or more different modules (or along one of several paths).

In this embodiment, the repeater 910 includes several processing paths through the signal modification circuit 950 and a processing path via the bypass circuit 956. In this embodiment, the processing paths can be referred to as differential signal processing paths. In this embodiment, the processing paths through the signal modification circuit 950 include an equalizer circuit 952 and/or a pre-emphasis circuit 954. In some embodiments, the bypass circuit 956 can be a type of pass-through circuit configured to bypass processing performed by the equalizer circuit 952 and/or the pre-emphasis circuit 954. The equalizer circuit 952 can be configured to restore an incoming signal that has been attenuated, and the pre-emphasis circuit 954 can be configured to boost the incoming signal. In this embodiment, any of the signals 92 can be diverted through the bypass circuit 956 by the control circuit 940.

As shown in FIG. 9, processing performed by the transmitter 900 and the receiver 920 is performed based on a differential clock signal CLK+/CLK−. In some embodiments, the differential clock signal can be processed through the repeater 910 similar to the signals 92. In some embodiments, the differential clock signal can be bypassed through the repeater 910.

As shown in FIG. 9, the transmitter 900 is configured to communicate with the receiver 920 via a control signal processor 970 of the repeater 910. As shown in FIG. 9, the transmitter 900 and receiver 920 are configured to communicate via control signal SDA (which can stand for serial data), which is a bidirectional protocol signal as indicated by the double-sided arrows, and are configured to communicate via control signal SCL (which can stand for serial clock), which is a unidirectional protocol signal as indicated by the single-sided arrow. In some embodiments, one or more functions of the signal modification circuit 950 can be managed (e.g., control) by the control signal processor 970 based on one or more of the control signals SDA, SCL. In some embodiments, the control signals SDA and/or SCL can be, for example, 400 KHz control signals.

Figure 10:
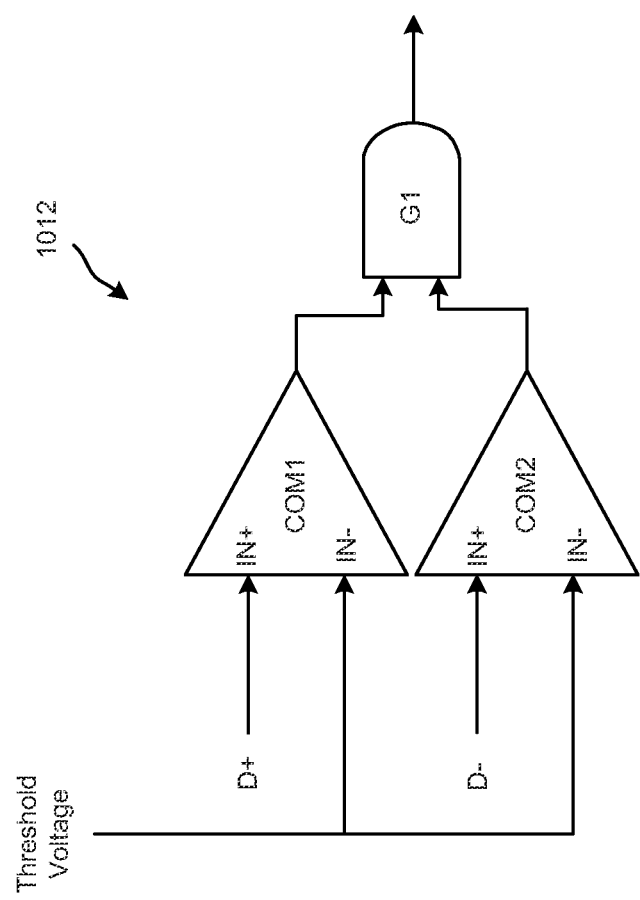
FIG. 10 is a schematic diagram that illustrates at least a portion of a control circuit, according to an embodiment.

FIG. 10 is a schematic diagram that illustrates at least a portion 1012 of a control circuit, according to an embodiment. As shown in FIG. 10, the portion 1012 of the control circuit includes two comparators COM1 and COM2. The comparators are configured to each compare voltages of a differential signal D+/D− with a threshold voltage (which can be a threshold condition). The output of the comparators is processed at AND gate G1 to produce a result that can be used to trigger a signal modification circuit (e.g., signal modification circuit 950 shown in FIG. 9) to modify at least a portion of the differential signal D+/D−. In this embodiments, in response to IN+ being greater than IN− (to produce a binary result of 0 from the AND gate G1), modification may not be triggered, and in response to IN+ being less than IN− (to produce a binary result of 1 from the AND gate G1), modification may be triggered.

Implementations of the various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry (e.g., an FPGA (field programmable gate array) or an ASIC (application-specific integrated circuit)).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data (e.g., magnetic, magneto-optical disks, or optical disks). Information carriers suitable for embodying computer program instructions and data include all forms of non-volatile memory, including by way of example semiconductor memory devices (e.g., EPROM, EEPROM, and flash memory devices); magnetic disks (e.g., internal hard disks or removable disks); magneto-optical disks; and CD-ROM and DVD-ROM disks. The processor and the memory may be supplemented by, or incorporated in special purpose logic circuitry.

To provide for interaction with a user, implementations may be implemented on a computer having a display device (e.g., a cathode ray tube (CRT), a light emitting diode (LED), or liquid crystal display (LCD) display device) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

Implementations may be implemented in a computing system that includes a back-end component (e.g., as a data server), or that includes a middleware component (e.g., an application server), or that includes a front-end component (e.g., a client computer having a graphical user interface or a Web browser) through which a user can interact with an implementation, or any combination of such back-end, middleware, or front-end components. Components may be interconnected by any form or medium of digital data communication (e.g., a communication network). Examples of communication networks include a local area network (LAN) and a wide area network (WAN) (e.g., the Internet).

Some implementations may be implemented using various semiconductor processing and/or packaging techniques. As discussed above, some embodiments may be implemented using various types of semiconductor processing techniques associated with semiconductor substrates including, but not limited to, for example, Silicon (Si), Gallium Arsenide (GaAs), Silicon Carbide (SiC), and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A repeater, comprising:
an input terminal configured to be coupled to a first portion of a MIPI signal path, the MIPI signal path being a physical path, the MIPI signal path being a unidirectional path between a receiver and a transmitter, the input terminal configured to receive a set of signals from the receiver via the MIPI signal path, the set of signals including a high-speed signal compliant with a MIPI specification and a low-power signal compliant with the MIPI specification; and
an output terminal configured to be coupled to a second portion of the MIPI signal path, the first portion of the MIPI signal path and the second portion of the MIPI signal path having a combined distance greater than 30 centimeters.

2. The repeater of claim 1, wherein the set of signals collectively define a multi-frequency signal compliant with the MIPI specification, the high-speed signal having a voltage range less than a voltage range of the low-power signal.

3. The repeater of claim 1, wherein the MIPI signal path is compliant with a MIPI specification for a physical layer (PHY) connection.

4. The repeater of claim 1, wherein the first portion of the MIPI signal path and the second portion of the MIPI signal path have a combined distance greater than 45 centimeters.

5. The repeater of claim 1, further comprising:
a signal modification circuit configured to amplify at least some portions of only one type of signal from the set of signals.

6. The repeater of claim 1, further comprising:
a signal modification circuit configured to modify the high-speed signal from the set of signals; and
a bypass circuit configured to cause the low-power signal from the set of signals to bypass processing performed by the signal modification circuit.

7. The repeater of claim 1, further comprising:
a signal modification circuit configured to restore at least some portions of the high-speed signal from the set of signals; and
a bypass circuit configured to cause the low-power signal from the set of signals to bypass processing performed by the signal modification circuit.

8. The repeater of claim 1, further comprising:
a signal modification circuit configured to restore a deteriorated portion of the high-speed signal from the set of signals; and
a bypass circuit configured to cause the low-power signal from the set of signals to bypass processing performed by the signal modification circuit.

9. The repeater of claim 1, further comprising:
a control circuit configured to determine that the low-power signal from the set of signals is greater than a threshold voltage for triggering restoration of at least a portion of the low-power signal from the set of signals, the control circuit configured to determine that the high-speed signal is less than the threshold voltage for triggering restoration.

10. The repeater of claim 1, wherein the receiver is included in a processor of a computing device, the transmitter is included in an image capture device.

11. The repeater of claim 1, wherein the repeater is included in a laptop computing device.

12. A repeater, comprising:
an input terminal configured to be coupled to a first portion of a MIPI signal path, the MIPI signal path being a physical path, the MIPI signal path being a unidirectional path between a receiver and a transmitter, the input terminal configured to receive a set of signals from the receiver via the MIPI signal path;
an output terminal configured to be coupled to a second portion of the MIPI signal path;
a signal modification circuit configured to modify a first signal from the set of signals; and
a bypass circuit configured to cause a second signal from the set of signals to bypass processing performed by the signal modification circuit.

13. The repeater of claim 12, wherein the set of signals collectively define a multi-frequency signal, the first signal having a voltage range less than a voltage range of the second signal.

14. The repeater of claim 12, wherein the MIPI signal path is compliant with a MIPI specification for a physical layer (PHY) connection.

15. The repeater of claim 12, wherein the first portion of the MIPI signal path and the second portion of the MIPI signal path have a combined distance greater than 30 centimeters.

16. The repeater of claim 12, wherein the modifying by the signal modification circuit includes restoration,
the repeater further comprising:
a control circuit configured to determine that the first signal from the set of signals is less than a threshold voltage for triggering the restoration of at least a portion of the first signal from the set of signals.

17. A repeater, comprising:
an input terminal configured to be coupled to a first portion of a MIPI signal path, the MIPI signal path being a physical path, the MIPI signal path being a unidirectional path between a receiver and a transmitter, the input terminal configured to receive a set of signals from the receiver via the MIPI signal path;
an output terminal configured to be coupled to a second portion of the MIPI signal path;
a signal modification circuit configured to restore at least some portions of a high-speed signal from the set of signals; and
a bypass circuit configured to cause a low-power signal from the set of signals to bypass processing performed by the signal modification circuit.

18. The repeater of claim 17, wherein the set of signals collectively define a multi-frequency signal, the high-speed signal having a voltage range less than a voltage range of the low-power signal.

19. The repeater of claim 17, wherein the MIPI signal path is compliant with a MIPI specification for a physical layer (PHY) connection.

20. The repeater of claim 17, wherein the first portion of the MIPI signal path and the second portion of the MIPI signal path have a combined distance greater than 30 centimeters.

21. The repeater of claim 17, wherein the signal modification circuit is configured to restore a deteriorated portion of the high-speed signal.

22. The repeater of claim 17, further comprising:
a control circuit configured to determine that the high-speed signal from the set of signals is less than a threshold voltage for triggering the restoration of the at least some portions of the high-speed signal from the set of signals.

* * * * *